Jan. 6, 1925.   1,522,302
J. KORDOWSKI
AUTOMOBILE BUMPER
Filed May 6, 1924
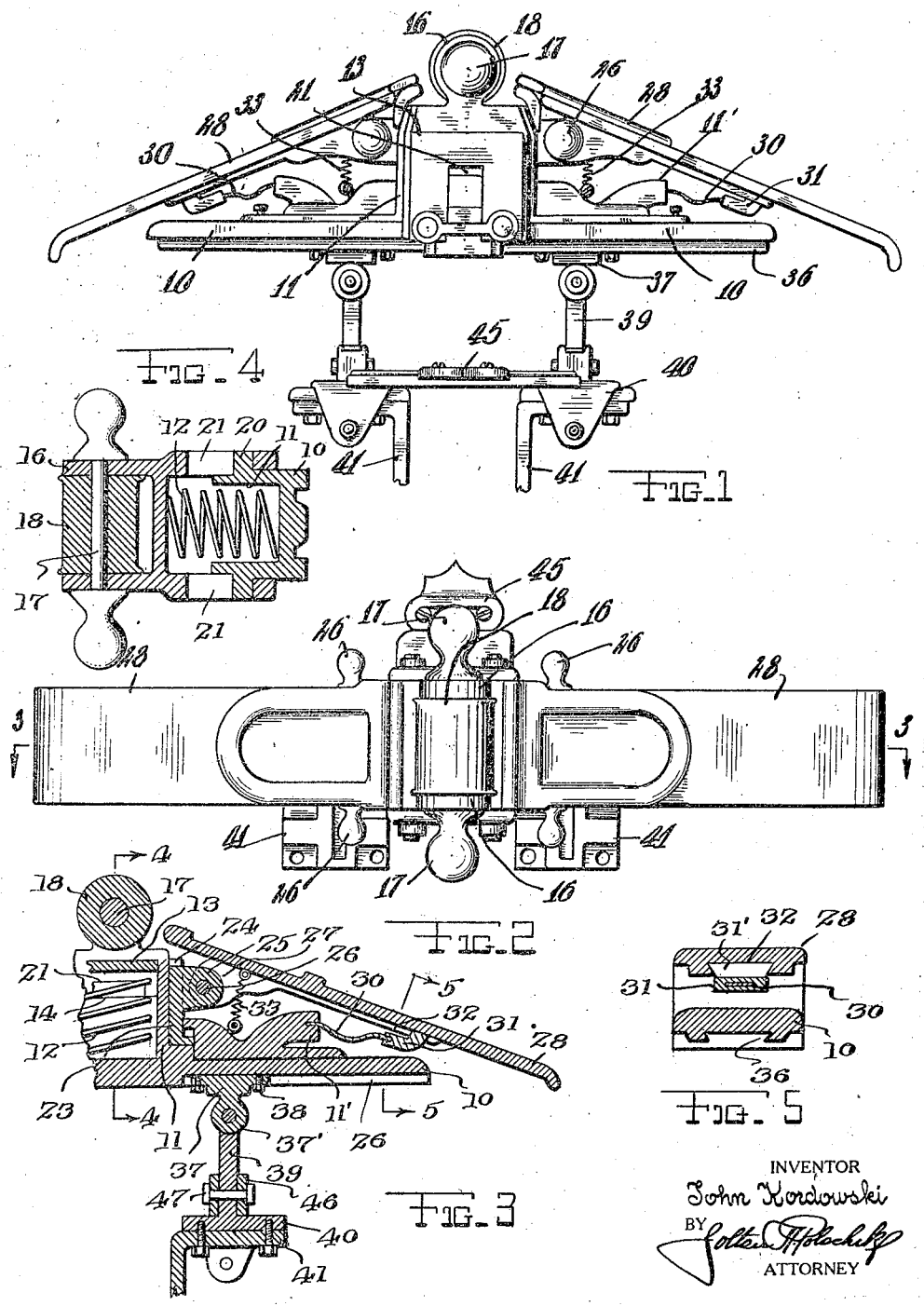
INVENTOR
John Kordowski
BY
ATTORNEY Patented Jan. 6, 1925.

1,522,302

UNITED STATES PATENT OFFICE.

JOHN KORDOWSKI, OF ERIE, PENNSYLVANIA.

AUTOMOBILE BUMPER.

Application filed May 6, 1924. Serial No. 711,309.

*To all whom it may concern:*

Be it known that I, JOHN KORDOWSKI, citizen of Poland, residing at 432 E. 13th St., Erie, in the county of Erie and State of Pennsylvania, have invented certain new and useful Improvements in Automobile Bumpers, of which the following is a specification.

This invention relates generally to bumpers for automobiles, motor trucks or like vehicles, and it has for an object to provide an improved form of resilient bumper constructed to cause any object struck to be deflected toward the side of the vehicle, in addition to having the force of the blow lessened by yielding character of the bumper.

For further comprehension of the invention, and of the objects and advantages thereof, reference will be had to the following description and accompanying drawing, and to the appended claims in which the various novel features of the invention are more particularly set forth.

Fig. 1 of the drawings is a plan view of my improved bumper.

Fig. 2 is a front view.

Fig. 3 is a fragmentary horizontal sectional view taken on the line 3—3 of Fig. 2.

Fig. 4 is a transverse sectional view taken on the line 4—4 of Fig. 3.

Fig. 5 is a transverse sectional view taken on the line 5—5 of Fig. 3.

As here embodied my improved bumper comprises a bar 10 which extends transversely in front of the automobile, and is adapted to be secured thereto as will be presently set forth. Formed on the front side of this bar midway between its ends is a hollow boss or projection 11 in which is located an expansible spring 12 which bears outwardly on a U-shaped member 13 which straddles the projection 11, the latter being cut away at the sides thereof at 14 to permit of movement to accommodate the yoke portion of the said member. This member 13 is formed with ears 16 at the side thereof through which pass a pintle 17 on which is mounted a buffer member in the form of a roller 18. Outward movement of the member 13 under the pressure of spring 12 is limited by lugs 20 on the boss which engage in openings 21 in the legs of the said member.

Projecting from the end walls of the part 11 are the ears or lugs 25 to which are connected by the hinge pintles 26 the lugs or ears 27 on the inclined bars 28 which extend outwardly in front of the bar 10 from the centre toward the ends of the latter, these bars 28 overlapping the ends of the bar 10. Fixed at one end to projections 11' from the boss are the flat springs 30 which are fixed at their opposite ends in the blocks 31 which have dovetail extensions 31' engaging in complementary guide member 32 on the rear faces of the bars 28. These springs 30 serve as resilient abutments for the outer ends of the bars 28. Connected each at one end to the boss 11' and at the other end to the bars 28 are tension springs 33.

To secure the bumper to the automobile or other vehicle I form in the rear face of the bar 10 the dovetail guides 36 in which engage the complementary blocks 37 through which are threaded the screws 38 which are adapted to bear on the rear face of the bar 10 to lock the blocks in adjusted positions thereon according to the distance between the side frame members of the automobiles to which the bumper is to be applied. These blocks 37 are formed with rearwardly projecting hinge ears 37' to which are hinged the forward ends of the arms 39 having transverse feet 40 on their rear ends adapted to be secured as by the screws to the angular brackets 41 which are fixed to the said side frame members of the automobile. A yoke member 45 extends between the arms 39 and is formed with pairs of lugs such as 46 on its ends which straddle the arms and hold them rigid, these lugs being received by bolts 47 to the said arms.

In the event of an object striking the bumper toward the centre thereof the member 13 will first yield, compressing the spring 12, and will then tend to move forward; the roller acting to direct the object toward the side and upon one of the bars 28 which latter in turn yield by swinging backward on their pivots and by their inclined position tend to move the object toward the side of the automobile.

For use in removing bolts I may provide the implement shown in Fig. 6 and which comprises the arms 50 hinged together as at 51 and formed at their forward ends with gripping elements 52, which latter are pressed toward one another by the tension spring 53 and the compression spring 54.

While I have illustrated and described a preferred embodiment of my invention it is to be understood that I do not limit myself to the precise construction herein shown, and that various changes and modifications might be made therein without departing from the spirit and scope of the invention as defined in the appended claims.

Having thus described my invention what I claim as new and desire to protect by Letters Patent of the United States is as follows:—

1. A bumper for vehicles comprising a transverse bar, a central bumper element yieldingly mounted on said bar, side bumper elements hinged at one end to said bar, and resilient buffer means interposed between the other ends of said side bumper elements and the said bar.

2. A bumper for vehicles comprising a transverse bar, a central bumper element yieldingly mounted on said bar, side bumper elements hinged at one end to said bar, and resilient buffer means interposed between the other ends of said side bumper elements and the said bar, said central bumper element having a roller mounted on the front thereof on a vertical axis.

3. A bumper for vehicles comprising a transverse bar formed midway between its ends with a forwardly projecting hollow boss, a U-bracket straddling said boss, a spring in said boss pressing outward on said U-bracket, a roller mounted on said U-bracket, and resiliently mounted side bars extending from the said bracket along the said bar.

4. A bumper for vehicles comprising a transverse bar formed midway between its ends with a forwardly projecting hollow boss, a U-bracket, a roller mounted on said U-bracket, and resiliently mounted side bars extending from the said bracket along the said bar, said side bars being inclined with respect to the said bar.

5. A bumper for vehicles comprising a transverse bar formed midway between its ends with a forwardly projecting hollow boss, a U-bracket straddling said boss, a spring in said boss pressing outward on said U-bracket, a roller mounted on said U-bracket, and resiliently mounted side bars extending from the said bracket along the said bar, said side bars being hinged to the said boss, and spring buffer elements interposed between said side bars and the main bar.

6. A bumper for vehicles comprising a transverse bar formed midway between its ends with a forwardly projecting hollow boss, a U-bracket straddling said boss, a spring in said boss pressing outward on said U-bracket, a roller mounted on said U-bracket, and resiliently mounted side bars extending from the said bracket along the said bar, said side bars being hinged to the said boss, and spring buffer elements interposed between said side bars and the main bar, said spring buffer elements comprising flat springs fixed at one end to said boss, blocks to which the opposite ends of said springs are fixed, and longitudinal guide members formed on the rear faces of said side bars with which said blocks are slidably engaged.

In testimony whereof I have affixed my signature.

JOHN KORDOWSKI.